United States Patent Office 3,725,087
Patented Apr. 3, 1973

3,725,087
DEHYDRATED POTATO PIECES
Paul G. Miller, Hsinchu, Taiwan, and Francis C. Griffith, Idaho Falls, Idaho, assignors to Rogers Brothers Company, Idaho Falls, Idaho
No Drawing. Filed Aug. 7, 1970, Ser. No. 62,200
Int. Cl. A23l 1/12
U.S. Cl. 99—207      14 Claims

ABSTRACT OF THE DISCLOSURE

Process for producing dehydrated potato pieces for making hash brown potatoes. A low mash temperature of 160–179° F. is coupled with a final drying at a temperature of 90–210° F. and a high humidity of at least 20% for at least 25% of the total final drying time to a moisture content not greater than 8% and at a relative humidity of at least 10% for the remainder of the drying period. A multiple stage final drying is optional.

---

This invention relates generally to a process for producing dehydrated shaped potato pieces. More particularly, the present invention is concerned with the process for producing pieces of dehydrated potatoes that may be formed into the product commonly known as hash brown potatoes.

It is the object of the present invention to produce pieces of shaped dehydrated potatoes such as may be in the form of slices or dice or ribbons which are capable of rehydrating easily and quickly to be baked or fried after rehydration to produce a product having a natural potato appearance and taste. It is known that dehydrated potato pieces have been produced which may be used to produce the hash brown style potatoes. Such a process is disclosed in French patent No. 1,528,111.

The product produced in accordance with this patent has been subject to a mash temperature of at least 190° F. It is further disclosed that a temperature of as low as 170° F. produces undesirable results and that only with the mash temperature of above 190° F. it is possible to achieve the results sought in the patent. The patented process further requires a particular drying temperature of 188–199° F. to prevent the outside layer of the extruded pieces from drying too rapidly.

This process, while producing an acceptable product to the taste of some, nevertheless is found by others to have an undesirable texture and mouth-feel not sufficiently similar to fresh or fresh-frozen hash brown potatoes. Moreover, the high mash temperature required is not only an uneconomical facet but also is most likely to bring about substantial if not complete gelatinization of the starch originating from the potato granules. The gelatinized starch produces a very dense consistency which does not provide a taste and texture sufficiently similar to the natural potato product, either fresh or frozen.

It has been discovered that the appearance of the rehydrated product, whether it is baked or fried into the form of hash brown potatoes may be substantially improved by avoiding the high mash temperature. The benefits of this invention are obtained by heating the mash to temperatures in the range of 160–179° F. and then drying the previously shaped pieces at a temperature between 90° F. and 210° F. provided the relative humidity of the air is at least 20% for at least 25% of the total time required to achieve the drying of the pieces to a moisture content of not greater than 8% and thereafter subjecting the pieces to a relative humidity of at least 10% for the remainder of the drying period.

It has been discovered that a procedure using the specified lower temperature range of the mash temperature and a final drying at a high humidity will produce a product having a natural potato appearance and a texture and a mouth-feel similar to fresh or frozen hash brown potatoes.

The process of the present invention is carried out using cooked fresh potatoes, or dehydrated products such as flakes, crushed dice or mixtures thereof to form a mash in which the solid content is 21–23% preferably 21.9–22.5% solids. The solid content within these ranges is desirable although it is not critical to the present invention.

If the origin of the potato mash in this process includes fresh potatoes, it is desirable for the quality of the final product, to eliminate the imperfections and undesirable parts of the potato all in well-known manner.

Various additives may be added to regulate the stability, color, texture and taste of the mash, all of which are optional, for instance, sugar in amount of about 1.0% by weight, cornstarch in the amount of about 7.5% by weight may be incorporated into the mash.

The mash is preferably mixed in a large blender, suitably sized to hold the moist mash. Provision must also be made for heating the mash, preferably by steam, so that the mash temperature is raised to 160–179° F., preferably 165–175° F. and ideally 168–172° F. Desirably, although not necessarily, the mash temperature should be raised by the use of steam or the like heating means, prior to the addition of any of the optional ingredients such as sugar or starch or the like.

After the mash has been raised to the proper temperature, it is ready for shaping. The usual shaping procedure includes extrusion, but may include any other form of shaping if desired. The extrusion may be in the form of sheets which may be subsequently cut into any form. Preferably the shaping takes the form of extrusion into ribbons, for instance, those that may be ⅛ by ⁷⁄₃₂ inch in cross-section. It should be understood that any shape cross-section, round, square, etc., from ⅛ to 1½ inches would be acceptable. If, for instance, the extrusion is in the form of the ribbon, it is desirably cut into lengths that may be about 1 inch long and may extend to approximately 1½ inches.

In order to provide some shape retention, it is advisable, although not essential to pass the mash, subsequent to extrusion, through a pre-drying step to lower the moisture content from the 77–79% moisture to preferably a moisture content of 64–68%. These moisture content ranges are not critical but do lead to a substantially improved product.

The pre-drying is preferably brought about at a temperature between 250–500° F. for 2 to 15 minutes, most ideally the temperature of the pre-drying is 430–500° F. for a period between 3 and 5 minutes. With a Proctor dryer temperature of 500° F., the product, passing on a pre-dryer belt, may enter the pre-dryer at a speed between 9.3 and 9.5 seconds for a distance of five feet. The air flow through the pre-dryer may be set at 1300 feet per minute, but may range from 100 to 2500 feet per minute. The foregoing parameters will vary in accordance with the type of drying equipment and are to be used as exemplary only.

After the pre-drying, the ribbon is usually cut into pieces, if such cutting has not occurred prior to the pre-drying.

In accordance with the present invention, it is possible to capitalize upon the economy of a low mash temperature contrary to the prior art teaching, provided the relationship between mash temperature and humidity in the final drying is recognized.

It is one of the important aspects of this invention that the use of a high humidity in the final drying, i.e., drying down to a moisture content of below 8.0%, will permit a mash temperature of 160–179° F. and yet will produce a product having the appearance and texture of natural potatoes whether fresh or frozen, neither of which is attainable at a mash temperature of 180° F. and above.

It has further been found possible to achieve this final drying in a single step wherein the temperature of the drying medium, air, may be at a temperature of 90–210° F., although preferably 170–210° F., and ideally 190–210° F., provided that the humidity for at least 25% of the total drying time is not less than 20% and that for the remaining 75% of the final drying period the relative humidity of the drying medium should not be below 10%. The time for the final drying is found to be generally between ½ to 6 hours although this time is not critical, it being only important to obtain the desired moisture content of below 8%, preferably 5.5–7.5% with the maintenance of the humidity as stated above. The maximum relative humidity is not critical but generally should be an upper maximum relative humidity of 98% with usually, but not necessarily, a 90% upper range being found acceptable.

It has been found that there is a unique relationship between the mash temperature and the humidity in the final drying. The lower the mash temperature within the ranges of 160–179° F., the higher the humidity of the drying medium required during the final drying stage. The reverse is also true, thus the higher mash temperatures between 175–179° F., for instance, should be accompanied by a lower humidity but never less than the 20% relative humidity during the first 25% of the total time for drying to a moisture content below 8%.

As examples of the one-step drying operation, the following is exemplary:

EXAMPLE 1

A mash of 1,000 pounds of cooked fresh potatoes or dehydrated granules or crushed dice reconstituted to a solids content of approximately 22% was mixed in a suitable blender. To this mash is added 1.0% sugar and 7.5% by weight cornstarch. The wet mash is heated with steam to produce a mash temperature of 170° F., whereupon it is extruded into continuous ribbons ⅛ by 7/32 inch and passed into a pre-dryer with counter-current air at 500° F. having a relative humidity between 20–30%. The moisture of the product coming out of the pre-dryer ranges from 65–68%. The ribbons are thereafter cut to lengths of approximately one inch and passed through a final dryer to be dried in moving air at a temperature of 210° F. for approximately 45 minutes to obtain a moisture content of about 7%. The relative humidity of the air in the final dryer is 20%.

EXAMPLE 2

The same procedure was followed as in Example 1 except the humidity was lowered in the later stage of drying as described below. The final drying was at a temperature of 210° F. with the relative humidity of the air at 20% for a period of 10 minutes and for the remaining portion, 30 minutes, of the final drying period the product is dried at 210° F. with air at a relative humidity of 10%. The total final drying time in this alternative embodiment is 40 minutes. The moisture content in this instance is 7%.

EXAMPLE 3

Omission of the pre-drying step in Example 1 produced similar results except that this required up to 6 minutes additional drying time at 210° F. and a relative humidity of 20%.

To aid in the determination of quality, it has been found that a rehydration ratio of the final product between 2.6:1 and 3.2:1 is particularly desirable. Additionally, the final product texture after heating and in a condition to be eaten was judged on an arbitrary scale between 1 and 10. A value of 1 was indicated to be an extremely firm texture similar to the prior art process of the French patent, while a rating of 10 would mean the rehydrated heated product was similar to mashed potatoes in appearance. An overall range of accepted texture would be between 4 and 8 with a particular value of 7 found to be most desirable to give the proper texture and mouth-feel similar to fresh or fresh-frozen hash brown potatoes.

The foregoing examples were all found to have a texture value of 7 and a rehydration value varying between 2.7:1 and 3.0:1.

It has been found that various additional improvements may be made in the quality of the product, all within the scope of the present invention, if the final drying is performed in at least two stages and preferably three stages. Multiple stage drying permits rapid economical and commercial drying without product puffing and without loss of texture.

Further examples are set forth in the following table:

TABLE I

| | | | | |
|---|---|---|---|---|
| Mash temperature, °F | 161 | 175 | 169 | 165 |
| Predrier air temp., °F | 490 | 490 | 500 | 500 |
| Retention time, min | 3.1 | 3.1 | 2.9 | 2.8 |
| Air humidity, percent | 23 | 23 | 28 | 24 |
| Air flow, ft./min | 1,050 | 1,075 | 1,125 | 1,350 |
| Final drying; | | | | |
| Stage A; | | | | |
| Air temp., °F | 140–145 | 139–145 | 127–140 | 136–140 |
| Humidity, percent | 27–70 | 25–70 | 20–45 | 32–45 |
| Retention time, min | 16.8 | 16.8 | 16.9 | 15.0 |
| Stage B; | | | | |
| Air temp., °F | 198–200 | 199–200 | 197–200 | 200 |
| Humidity, percent | 20 | 20 | 20 | 20 |
| Retention time, min | 17.6 | 17.6 | 17.1 | 20.0 |
| Stage C; | | | | |
| Air temp., °F | 125–130 | 120–130 | 91–133 | 125–140 |
| Humidity, percent | 97–100 | 61–94 | 20–66 | 29–45 |
| Retention time, min | 98 | 98 | 97.6 | 102.4 |
| Finished product, rehydration ratio | 2.92=1 | 2.75=1 | 3.08:1 | 2.92=1 |
| Finished product, grilled texture (after frying) | 7 | 6 | 7 | 7 |

It may be seen from the foregoing examples that the texture meets the standard desired for both appearance and taste and the rehydration rate is within the accepted range.

For consumption the products of any of the foregoing examples may be added to boiling salted water in an amount of about 1½ cups to ¾ cup of water, to which ½ teaspoon of salt and 2 tablespoons of butter have been added. After the pieces have been added to the water, the mixture should be permitted to stand away from the heat for several minutes, generally 5 minutes. Thereafter the excess liquid is poured off and the pieces are placed in a skillet greased with butter, the potato pieces are grilled at medium heat for approximately 4 minutes on each side to produce excellent quality hash brown potatoes.

From the foregoing, it may be seen that the present invention produces a high quality potato product having the appearance, texture and mouth-feel of fresh or frozen hash brown potatoes, neither of which could be attained with the usual high mash temperature of the prior art. Lower mash temperatures were not previously found useful due to the lack of appreciation of the value of high humidity in the final drying.

The product of this invention is found to hold together very well during rehydration and frying or baking contrary to what might be expected with low mash temperatures. Moreover, the storage characteristics of the present product meet all requirements for high quality.

We claim:

1. Process for producing dehydrated shaped pieces of potatoes comprising:

forming a cooked moist mash of potatoes, heating said mash to a temperature of 160–179° F., shaping said mash into pieces of about ⅛ to 7/32 inch in cross-section, drying said pieces at a temperature of 90–210° F. at a relative air humidity of at least 20% for a time of at least 25% of the total time for drying said pieces to a moisture content of not greater than 8% and at a relative air humidity of at least 10% for the remainder of the drying time.

2. The process of claim 1 wherein said drying temperature is 190–210° F.

3. The process of claim 1 wherein said mash temperature is 165–175° F.

4. The process of claim 1 wherein said shaping includes extrusion.

5. The process of claim 1 wherein said moisture content is 5.0–7.5%.

6. The process of claim 1 including pre-drying prior to drying at a temperature of 250–500° F. for 3–15 minutes to obtain a moisture content of 64–68%.

7. The process of claim 1 wherein said drying is at a temperature of 210° F. for 45 minutes at a relative air humidity of 20%.

8. The process of claim 1 wherein said drying is at 170–210° F.

9. The process of claim 1 wherein said drying is in three successive stages:
- stage A 130–170° F. at 20–70% relative air humidity for 10–20 minutes;
- stage B 195–205° F. at 20–30% relative air humidity for 10–25 minutes;
- stage C 90–145° F. at 20–90% relative air humidity for 90–120 minutes.

10. The process of claim 6 wherein said drying temperature is 190–210° F.

11. The process of claim 6 wherein said mash temperature is 165–175° F.

12. The process of claim 6 wherein said drying is at a temperature of 210° F. for 45 minutes at a relative air humidity of 20%.

13. The process of claim 6 wherein said drying is at 170–210° F.

14. The process of claim 6 wherein said drying is in three successive stages:
- stage A 130–170° F. at 20–70% relative air humidity for 10–20 minutes;
- stage B 195–205° F. at 20–30% relative air humidity for 10–25 minutes;
- stage C 90–145° F. at 20–90% relative air humidity for 90–120 minutes.

References Cited

UNITED STATES PATENTS

| | | | |
|---|---|---|---|
| 3,085,019 | 4/1963 | Kveweman et al. | 99—207 |
| 3,110,574 | 11/1963 | Kodras | 99—207 X |
| 3,230,094 | 1/1966 | Hilton | 99—207 |
| 3,297,450 | 1/1967 | S. J. Loska, Jr. | 99—100 P |
| 3,451,822 | 6/1969 | Fast et al. | 99—100 P |

FOREIGN PATENTS 1,528,111    4/1968    France.

NORMAN YUDKOFF, Primary Examiner

K. P. VAN WYCK, Assistant Examiner

U.S. Cl. X.R.

99—100 P